US 6,735,654 B2

(12) United States Patent
Quan et al.

(10) Patent No.: US 6,735,654 B2
(45) Date of Patent: *May 11, 2004

(54) METHOD AND APPARATUS FOR EFFICIENTLY BROADCASTING TRANSACTIONS BETWEEN AN ADDRESS REPEATER AND A CLIENT

(75) Inventors: Tai Quan, San Jose, CA (US); Brian L. Smith, Sunnyvale, CA (US); James C. Lewis, San Jose, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 521 days.

This patent is subject to a terminal disclaimer.

(21) Appl. No.: 09/815,432

(22) Filed: Mar. 19, 2001

(65) Prior Publication Data

US 2002/0133656 A1 Sep. 19, 2002

(51) Int. Cl.[7] .................. G06F 12/00; G06F 13/14; G06F 13/38
(52) U.S. Cl. .................. 710/243; 710/120; 714/51
(58) Field of Search .................. 710/112, 119, 710/243, 120; 711/113; 713/310; 375/211; 370/293, 447; 345/535; 714/51

(56) References Cited

U.S. PATENT DOCUMENTS

| 5,265,123 A | * | 11/1993 | Vijeh et al. .................. 375/211 |
| 5,519,838 A | * | 5/1996 | Ziegler et al. ................ 710/119 |
| 5,546,587 A | * | 8/1996 | Silver .......................... 710/242 |
| 5,588,125 A | * | 12/1996 | Bennett ........................ 710/306 |
| 5,754,877 A | | 5/1998 | Hagersten et al. ......... 395/800.29 |
| 5,796,605 A | * | 8/1998 | Hagersten ....................... 700/5 |
| 5,805,839 A | * | 9/1998 | Singhal ......................... 710/112 |
| 5,933,610 A | * | 8/1999 | Chambers et al. ............ 711/113 |
| 5,954,809 A | * | 9/1999 | Riley et al. .................. 710/119 |
| 5,960,034 A | * | 9/1999 | Lo ................................ 375/211 |
| 6,078,337 A | * | 6/2000 | Fukui et al. .................. 345/535 |
| 6,108,736 A | * | 8/2000 | Bell ............................. 710/107 |
| 6,167,403 A | | 12/2000 | Whitmire et al. ............. 707/10 |
| 6,243,411 B1 | * | 6/2001 | Chiou ........................... 375/211 |
| 6,282,588 B1 | * | 8/2001 | Yamamoto ..................... 710/27 |
| 6,295,281 B1 | * | 9/2001 | Itkowsky et al. ............. 370/293 |
| 6,411,628 B1 | * | 6/2002 | Hauck et al. ................. 370/447 |
| 6,446,215 B1 | * | 9/2002 | Meyer et al. ................ 713/310 |
| 2002/0133657 A1 | * | 9/2002 | Quan et al. .................. 710/243 |

FOREIGN PATENT DOCUMENTS

EP          0817094 A1    1/1998    ........... G06F/15/16

OTHER PUBLICATIONS

U.S. application Ser. No. 09/815,442, Quan *et al.*, Method and Apparatus for Efficiently Broadcasting Transactions between a First Address Repeater and a Second Address Repeater, Mar. 19, 2001.

U.S. application Ser. No. 09/815,443, Quan *et al.*, Method and Apparatus for Verifying Consistency between a First Address Repeater and a Second Address Repeater, Mar. 19, 2001.

* cited by examiner

*Primary Examiner*—Glenn A. Auve
*Assistant Examiner*—Christopher E. Lee
(74) *Attorney, Agent, or Firm*—Park, Vaughan & Fleming LLP (57) ABSTRACT

A computer system including a first repeater; a second repeater coupled to the first repeater; and a third repeater coupled to the first repeater. The second repeater is also coupled to a first client and a second client. The second repeater contains a distributed arbiter that predicts whether the first repeater will send a transaction to the second repeater.

20 Claims, 8 Drawing Sheets

METHOD AND APPARATUS FOR EFFICIENTLY BROADCASTING TRANSACTIONS BETWEEN AN ADDRESS REPEATER AND A CLIENT

This patent application discloses subject matter that is related to the subject matter disclosed in U.S. patent application Ser. Nos. 09/815,442 entitled "Method and Apparatus for Efficiently Broadcasting Transactions between a First Address Repeater and a Second Address Repeater," and 09/815,443 entitled "Method and Apparatus for Verifying Consistency between a First Address Repeater and a Second Address Repeater," filed on even date herein. Each of the above Patent Applications is hereby incorporated by reference.

1. FIELD OF THE INVENTION

The present invention relates to the field of multiprocessor computer systems and, more particularly, to the architectural connection of multiple microprocessors within a multiprocessor computer system.

2. BACKGROUND

Multiprocessing computer systems include two or more microprocessors that may be employed to perform computing tasks. A particular computing task may be performed on one microprocessor while other microprocessors perform unrelated computing tasks. Alternatively, components of a particular computing task may be distributed among multiple microprocessors to decrease the time required to perform the computing task as a whole.

A popular architecture in commercial multiprocessing computer systems is the symmetric multiprocessor (SMP) architecture. Typically, an SMP computer system comprises multiple microprocessors connected through a cache hierarchy to a shared bus. Additionally connected to the bus is a memory, which is shared among the microprocessors in the system. Access to any particular memory location within the memory occurs in a similar amount of time as access to any other particular memory location. Since each location in the memory may be accessed in a uniform manner, this structure is often referred to as a uniform memory architecture (UMA).

Processors are often configured with internal caches, and one or more caches are typically included in the cache hierarchy between the microprocessors and the shared bus in an SMP computer system. Multiple copies of data residing at a particular main memory address may be stored in these caches. In order to maintain the shared memory model, in which a particular address stores exactly one data value at any given time, shared bus computer systems employ cache coherency. Generally speaking, an operation is coherent if the effects of the operation upon data stored at a particular memory address are reflected in each copy of the data within the cache hierarchy. For example, when data stored at a particular memory address is updated, the update may be supplied to the caches that are storing copies of the previous data. Alternatively, the copies of the previous data may be invalidated in the caches such that a subsequent access to the particular memory address causes the updated copy to be transferred from main memory. For shared bus systems, a snoop bus protocol is typically employed. Each coherent transaction performed upon the shared bus is examined (or "snooped") against data in the caches. If a copy of the affected data is found, the state of the cache line containing the data may be updated in response to the coherent transaction.

Unfortunately, shared bus architectures suffer from several drawbacks which limit their usefulness in multiprocessing computer systems. As additional microprocessors are attached to the bus, the bandwidth required to supply the microprocessors with data and instructions may exceed the peak bandwidth of the bus. Thus, some microprocessors may be forced to wait for available bus bandwidth and the performance of the computer system will suffer when the bandwidth requirements of the microprocessors exceed available bus bandwidth.

Additionally, adding more microprocessors to a shared bus increases the capacitive loading on the bus and may even cause the physical length of the bus to be increased. The increased capacitive loading and extended bus length increases the delay in propagating a signal across the bus. Due to the increased propagation delay, transactions may take longer to perform. Therefore, the peak bandwidth of the bus may decrease as more microprocessors are added.

A common way to address the problems incurred as more microprocessors and devices are added to a shared bus system, is to have a hierarchy of buses. In a hierarchical shared bus system, the microprocessors and other bus devices are divided among several low-level buses. These low-level buses are connected by high-level buses. Transactions are originated on a low-level bus, transmitted to the high-level bus, and then driven back down to all the low level-buses by repeaters. Thus, all the bus devices see the transaction at the same time and transactions remain ordered. The hierarchical shared bus logically appears as one large shared bus to all the devices. Additionally, the hierarchical structure overcomes the electrical constraints of a single large shared bus.

3. SUMMARY OF INVENTION

One embodiment of the invention is a computer system including a first repeater; a second repeater coupled to the first repeater; and a third repeater coupled to the first repeater. The second repeater is also coupled to a first client and a second client. The second repeater contains a distributed arbiter that predicts whether the first repeater will send a transaction to the second repeater.

Another embodiment of the invention is a computer system including a first repeater; a second repeater coupled to the first repeater; and a third repeater coupled to the first repeater. The second repeater is also coupled to a first client and a second client. The second repeater contains a distributed arbiter that predicts whether the first repeater will send a transaction to the third repeater.

Still another embodiment of the invention is a computer system including a first repeater; a second repeater coupled to the first repeater; and a third repeater coupled to the first repeater. The second repeater is also coupled to a first client and a second client. The second repeater contains a distributed arbiter that predicts whether the first repeater will send a transaction to the second repeater and whether the first repeater will send a transaction to the third repeater.

4. BRIEF DESCRIPTION OF THE FIGURES

FIG. 7(*a*) presents a block diagram of an L1 port.

FIG. 7(*b*) presents another block diagram of an L1 port.

5. DESCRIPTION OF THE PREFERRED EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
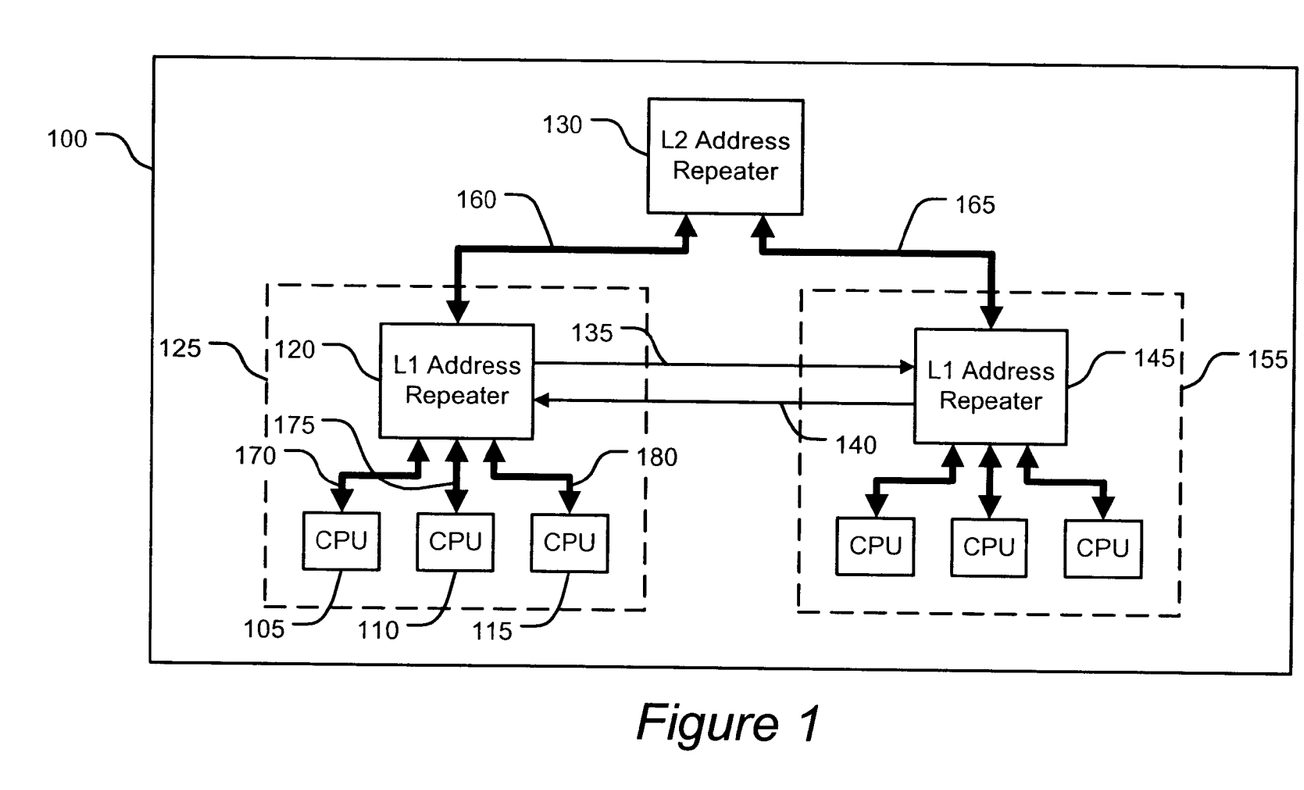
FIG. 1 presents a block diagram of a multiprocessing computer system.

A block diagram of a multiprocessing computer system 100 is presented in FIG. 1. The multiprocessing computer system includes two L1 address repeater nodes 125, and 155, and single L2 address repeater 130. The first L1 address repeater node 125 is coupled to the L2 address repeater via a first L1–L2 bus 160. Similarly, the second L1 address repeater node 155 is coupled to the L2 address repeater via a second L1–L2 bus 165. The second L1 address repeater node 155 may contain the same number of CPUs as in the first L1 address repeater node 125. Alternatively, the number of CPUs in the second L1 address repeater node 155 may be smaller or larger than the number of CPUs in the first L1 address repeater node 125. The computer system 100 may also include other components such as L1 address repeater input-output (I/O) nodes and input-output devices, but these components are not shown so as not to obscure the invention.

5.1 L1 Address Repeater Node

The L1 address repeater node 125 may include a plurality of microprocessors (CPUs) 105, 110, 115. In one embodiment, the CPUs may be an UltraSPARC-III microprocessor. However, in other embodiments, the CPUs may be a digital signal processor (DSP) or a microprocessor such as those produced by Intel, Motorola, Texas Instruments, Transmeta, or International Business Machines. These CPUs may also include memory, such as DRAM memory or RAMBUS memory, and high-speed cache memory (not shown). In addition, the CPUs may also include an outgoing request queue (not shown). CPUs 105, 110, and 115 are coupled to an L1 address repeater via CPU buses 170, 175, and 180. The CPU buses 170, 175, and 180 may be any bus that is capable of passing bus transactions. In one embodiment, the CPU bus may provide for a 60-bit wide data path and may also include additional signal lines for control signals as are known in the art.

The CPUs 105, 110, and 115 communicate with the L1 address repeater 120 by broadcasting and receiving bus transactions. Bus transactions may be broadcasted as bit-encoded packets. These packets may also include an address, a command, and/or a source ID. Other information, such as addressing modes or mask information, may also be encoded in each transaction.

5.2 L1 Address Repeater

Figure 2:
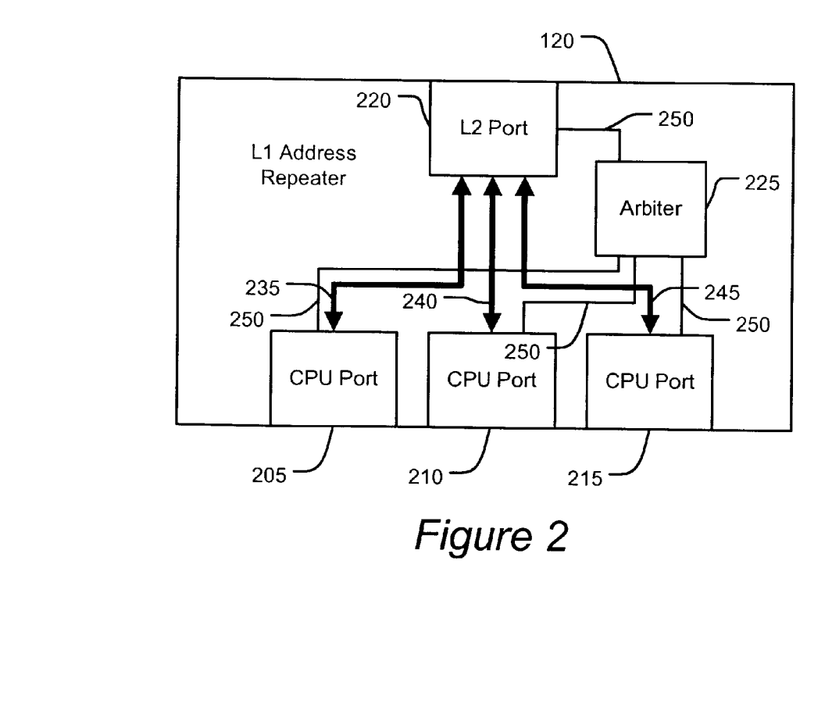
FIG. 2 presents a block diagram of an L1 address repeater.

A block diagram of the L1 address repeater 120 is presented in FIG. 2. L1 address repeater 120 includes a plurality of CPU ports 205, 210, and 215. These ports interface with CPUs via the CPU buses 170, 175, and 180. The CPU ports are further described in Section 5.2.1 below. The L2 port is further described in Section 5.2.2.

5.2.1 CPU Port

Figure 4A:
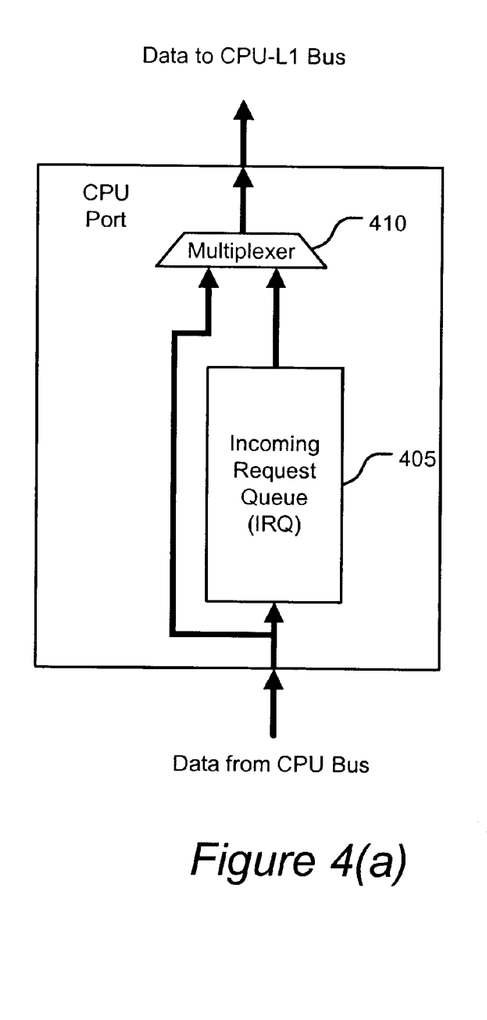
FIG. 4(a) presents a block diagram of a CPU port.

FIG. 4(*a*) presents a block diagram of a CPU port. FIG. 4(*a*) also presents the flow of data received from a CPU bus, through the CPU port, and out to a CPU-L1 bus. As shown in FIG. 4(*a*), the CPU port contains an incoming request queue (IRQ) 405. If the CPU port receives a transaction from a CPU and the transaction is not immediately sent to the L2 port because, for example, the L2 port has control of the CPU-L1 bus, then the IRQ 405 stores the transaction.

The IRQ 405 may be a plurality of registers, such as shift registers or may be a buffer, such as a first-in-first-out buffer, a circular buffer, or a queue buffer. The IRQ 405 may be any width sufficient to store transactions. In one embodiment, the IRQ 405 is 60 bits wide and contains storage for 16 transactions. When the CPU port obtains access to the CPU-L1 bus, then the transaction is passed through a multiplexer 410 and out to the CPU-L1 bus.

Figure 4B:
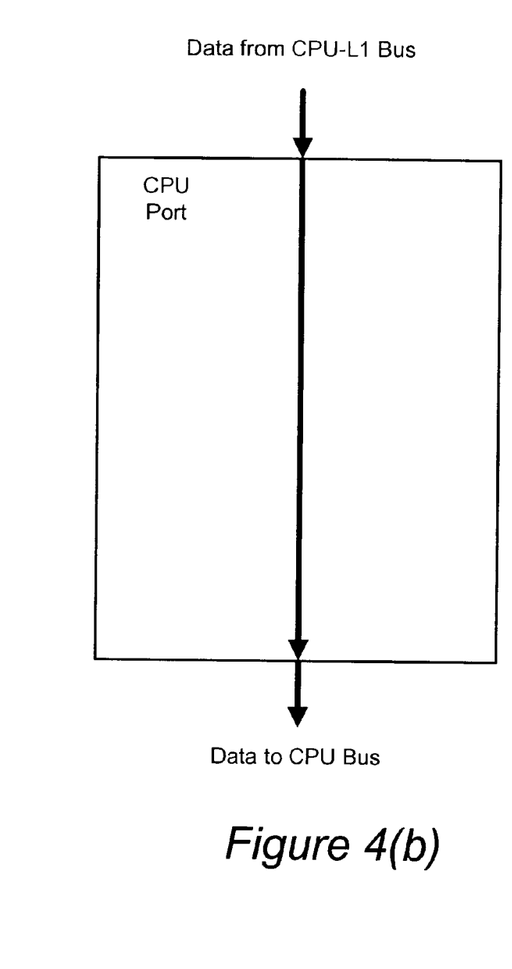
FIG. 4(b) presents another block diagram of a CPU port.

FIG. 4(*b*) presents the flow of data received from a CPU-L1 bus, through the CPU port, and out to the CPU bus. In one embodiment, the CPU port passes the data from the CPU-L1 bus directly to the CPU bus. In other embodiments (not shown), the CPU port may also include an outgoing queue, which may or may not be shared between a plurality of CPU ports.

5.2.2 L2 Port

Figure 5:
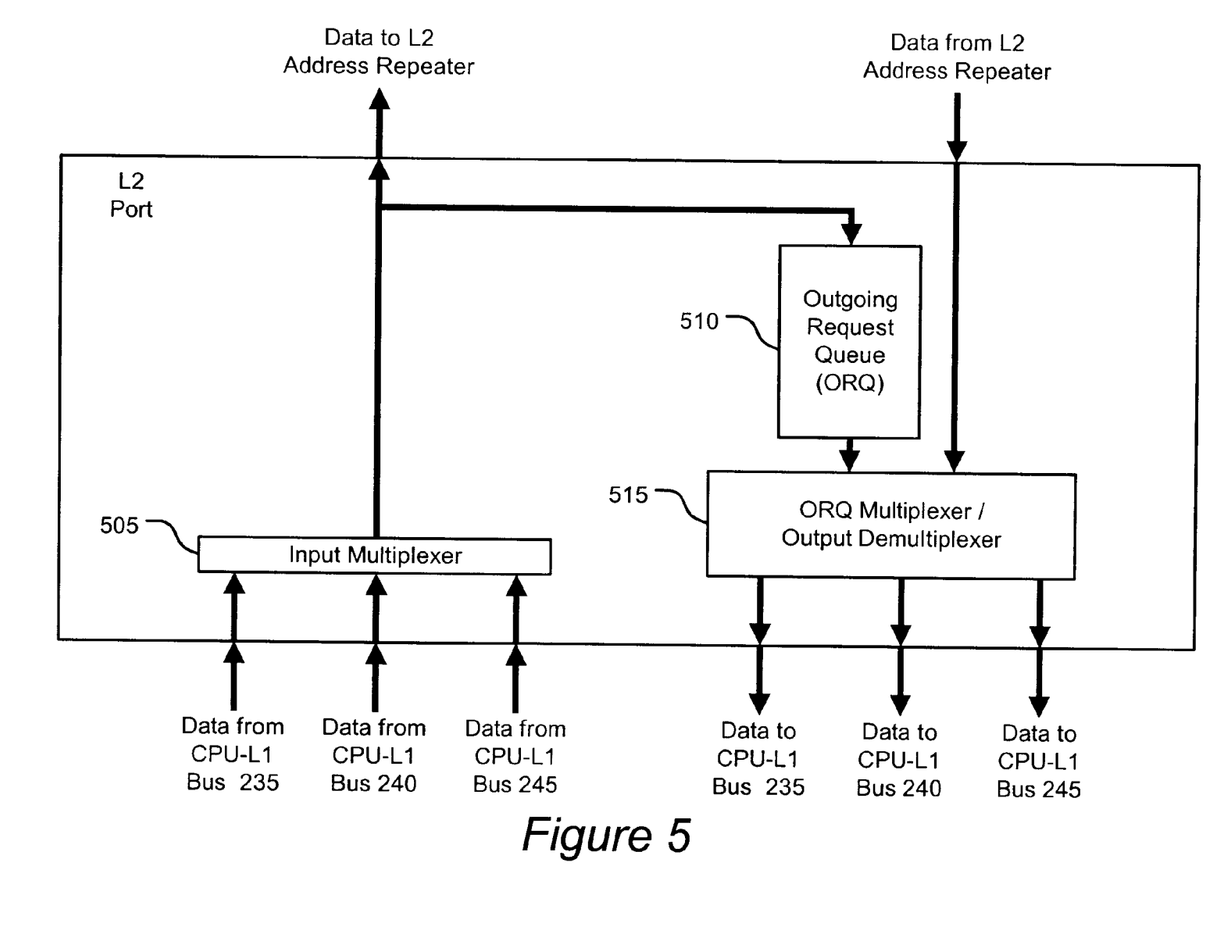
FIG. 5 presents a block diagram of an L2 port.

FIG. 5 presents a block diagram of an L2 port. When the L2 port receives a transaction from a CPU port via a CPU-L1 bus, the transaction passes through input multiplexer 505. The transaction is then passed to the L1-L2 bus. The transaction is also stored in an outgoing request queue (ORQ) 510. The ORQ 510 may be a plurality of registers, such as shift registers or may be a buffer, such as a first-in-first-out buffer, a circular buffer, or a queue buffer. The ORQ 510 may be any width sufficient to store transactions. In one embodiment of the invention, the ORQ 510 is 62 bits wide and contains storage for 16 transactions. The 2 extra bits may be utilized to store a transaction and information that identifies which of the three CPU ports originated the transaction. In addition, other methods known by those skilled in the art may be utilized to indicate the origin of a transaction.

5.2.3 L1 Address Repeater Arbiters

Figure 3:
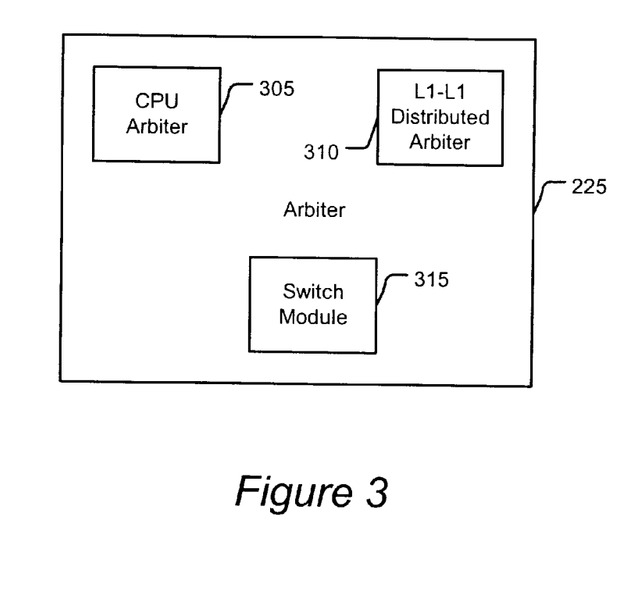
FIG. 3 presents a block diagram of an arbiter.

As shown in FIG. 2, the L1 address repeater also includes an arbiter 225. As shown in FIG. 3, the arbiter 225 may include a CPU arbiter 305, an L1-L1 distributed arbiter 310, and a switch module 315.

5.2.3.1 CPU Arbiter

The CPU arbiter 305 receives requests from the plurality of CPU ports 205, 210, and 215, and grants one CPU port the right to broadcast a transaction to the L2 port 220. In one embodiment, the arbitration algorithm is a round robin algorithm between the plurality of CPU ports 205, 210, and 215. However, other arbitration algorithms, such as priority-based algorithms, known by those skilled in the art may also be utilized. In some embodiments, transactions originating from the L2 port 220 are given priority over all transactions originating from the CPU ports 205, 210, and 215.

As discussed in Section 5.2, in some embodiments of the invention, each of the CPU ports 205, 210, and 215 has an IRQ 405. In such embodiments, if a CPU port requests access to the CPU-L1 bus and the request is not granted, the transaction is inserted in the CPU port's IRQ. If this occurs, the CPU port will continue to request access to the CPU-L1 bus as long as its IRQ is not empty. In some embodiments of the invention, when a CPU port receives a new transaction and the IRQ is not empty, the new transaction is stored in the IRQ in a manner that will preserve the sequence of transactions originating from the CPU's port.

When a CPU port is granted access to the CPU-L1 bus, the CPU port broadcasts a transaction and optionally, transfers information that identifies the CPU port that originated the transaction to the L2 port. Next, the L2 port receives the transaction and identifying information and stores both the transaction and the identifying information in the ORQ 510. After receiving the transaction, the L2 port then broadcasts the transaction to the L2 address repeater 130 via the L1-L2 bus.

5.2.3.2 L1-L1 Distributed Arbiter

While many methods of arbitration between L1 address repeaters may be utilized, in one embodiment of the invention, a distributed arbitration scheme may be implemented. In this embodiment, there will be no need for explicit arbitration because each L1 address repeater can accurately predict when the L2 address repeater will access the L1-L2 busses.

In order for an L1 address repeater to accurately predict when the L2 address repeater will access the L1-L2 busses, the L1 address repeater should be made aware of every transaction sent to the L2 address repeater. In some embodiments of the invention, the L1 address repeater should also be made aware of the L1 address repeater that originated each transaction sent to the L2 address repeater.

One method of making an L1 address repeater aware of such transactions is for each L1 address repeater to communicate directly with other L1 address repeaters. For example, each L1 address repeater could assert a TRAN-OUT signal 135 and 140 every time that the L1 address repeater drives a transaction to an L2 address repeater. Each TRAN-OUT signal 135 and 140 could be coupled to a TRAN-IN port (not shown) in each of the other L1 address repeaters in the computer system. Alternatively, other methods of communicating between L1 address repeaters could be used.

In the embodiment described above, each L1 address repeater would typically have a TRAN-IN port for each of the other L1 address repeaters in the computer system. In this embodiment, each TRAN-IN port would be associated with a transaction counter. The counter would be incremented each time another L1 address repeater sends a transaction to the L2 address repeater. The counter would be decremented each time the L1 address repeater receives a transaction from the L2 address repeater that originated from the other L1 address repeater. The value in a particular counter would represent the number of transactions in one of the IRQs in the L2 address repeater. The structure of the L2 address repeater ports is described in Section 5.3.1.

5.2.3.3 Switch Module

Referring again to FIG. 3, the L1 address repeater arbiter includes a switch module 315. The switch module 315, which is coupled to both the L1-L1 distributed arbiter 310 and the CPU arbiter 305, controls the generation of the TRAN-OUT, discussed in Section 5.2.3.2, and two other signals.

The first of these signals, the PRE-REQUEST signal 250, is sent from the switch module 315 to the L2 port and to one or more CPU ports. The PRE-REQUEST signal 250 informs the CPU ports that the L2 port will be sending the CPU ports a transaction in the near future. In some embodiments, a PRE-REQUEST signal is sent to a CPU after the L1 address repeater retrieves a transaction from its ORQ and determines that the transaction did not originate from the CPU. When a CPU port receives the PRE-REQUEST signal 250, if the CPU port has control of the CPU-L1 bus, the CPU completes sending the transaction that the CPU port is currently sending to the L2 port and then the CPU port releases control of the CPU-L1 bus.

When the L2 port receives the PRE-REQUEST signal 250, the L2 port removes a transaction from the L2 port's ORQ 510 and pre-configures the combination ORQ multiplexer/output demultiplexer 515 so that the transaction can pass directly to the CPU ports, which are coupled to the CPUs that did not originate the transaction. Thus, the latency may be reduced. In one embodiment, the latency may be reduced to a single bus cycle. Finally, the L2 port broadcasts the transaction that was removed from the ORQ 510 to the CPU ports that did not originate the transaction.

The switch module 315 also controls the generation of an INCOMING signal (not shown). The INCOMING signal is sent from the switch module 315 to a CPU port. In some embodiments, an INCOMING signal is sent to a CPU after the L1 address repeater retrieves a transaction from its ORQ and determines that the transaction originated from the CPU. When the CPU port receives the INCOMING signal, then the CPU retrieves the transaction from its own outgoing request queue. In addition, the CPU port sends a new transaction to the L2 port if the CPU port contains any transactions in its IRQ 405. In some embodiments, the CPU port may send the transaction to the L2 port during the same bus cycle that the L2 port is sending another transaction to one or more other CPU ports. The INCOMING signal is particularly useful in computer systems that utilize bi-directional buses to link a hierarchical arrangement of nodes, such as address repeater nodes. However, in such computer systems that utilize the INCOMING signal, it is possible for one node to starve another node by continuously issuing transactions. To prevent this starvation, in some embodiments of the invention, a protocol or arbitration mechanism may be provided. For example, one such protocol may be to prevent any node from issuing more than "N" consecutive transactions. Alternatively, a round-robin arbitration algorithm may be utilized that overrides the overuse of the INCOMING signal by a single node.

5.3 L2 Address Repeater

Figure 6:
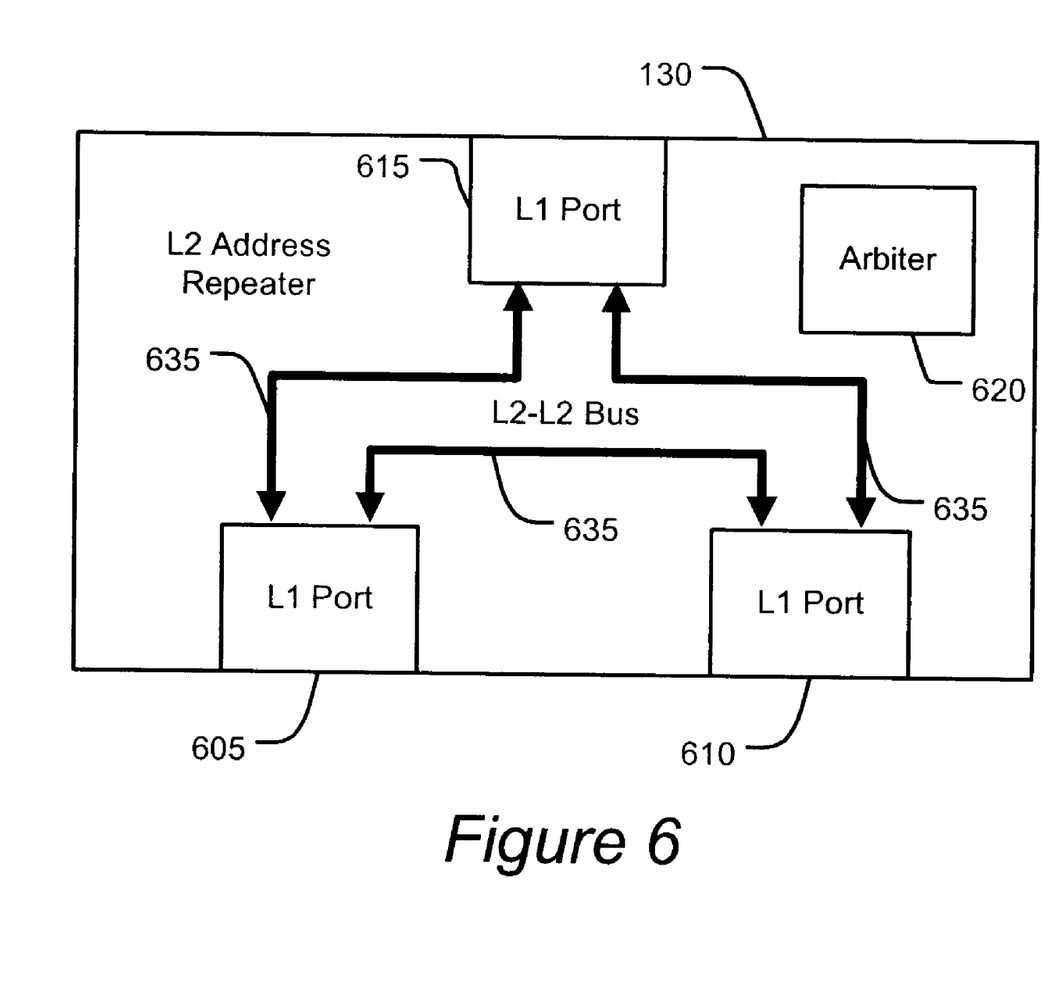
FIG. 6 presents a block diagram of an L2 address repeater.

FIG. 6 presents a block diagram of the L2 address repeater 130. The L2 address repeater 130 includes a plurality of L1 ports 605, 610, and 615. The L1 ports 605, 610, and 615 are further described in Section 5.3.1. In one embodiment, the first L1 port 605 may be coupled to L1 address repeater node 125 and the second L1 port 610 may be coupled to the second L1 address repeater node 155. In addition, the third L1 port 615 may be coupled to an L1 address repeater node that contains I/O devices (not shown). As shown in FIG. 6, an L2-L2 bus 635 couples the L1 ports 605, 610, and 615.

5.3.1 L1 Port

Figure 7A:
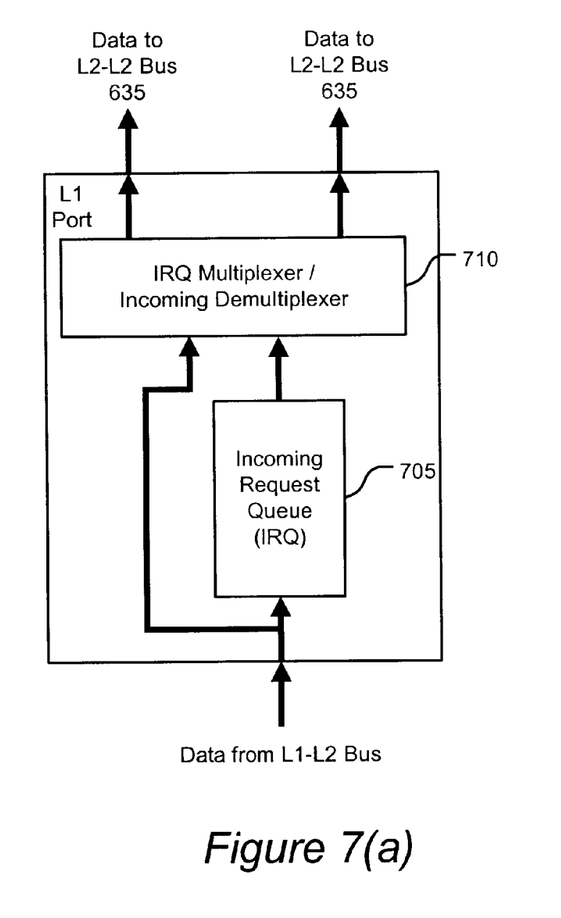

FIG. 7(a) presents a block diagram of an L1 port. FIG. 7(a) also presents the flow of data received from an L1-L2 bus, through the L1 port, and out to the L2-L2 bus. As shown in FIG. 7(a), the L1 port contains an incoming request queue (IRQ) 705, which is similar to a CPU port's IRQ. If the IRQ port receives a transaction from an L1-L2 bus and if the transaction is not immediately sent to the L2-L2 bus because, for example, another L1 port has control of the L2-L2 bus, then the IRQ 705 stores the transaction.

The IRQ 705 may be a plurality of registers, such as shift registers or may be a buffer, such as a first-in-first-out buffer, a circular buffer, or a queue buffer. The IRQ 705 may be any width sufficient to store transactions. In one embodiment, the IRQ 705 is 60 bits wide and contains storage for 16 transactions. When the L1 port obtains access to the L2-L2 bus, then the transaction is passed through a combination multiplexer/demultiplexer 710 and out to the L2-L2 bus.

Figure 7B:
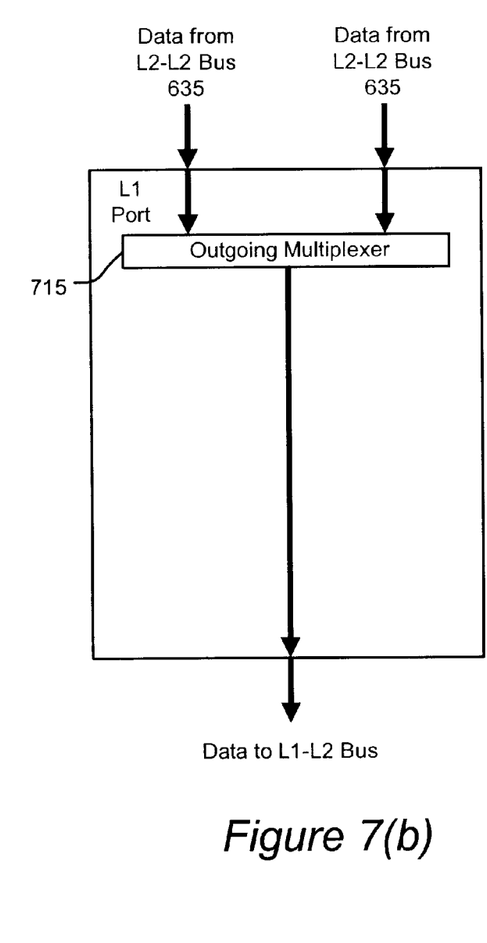

FIG. 7(*b*) presents the flow of data received from the L2-L2 bus, through the L1 port, and passed to the L1-L2 bus. In one embodiment, the L1 port passes the data from the L2-L2 bus through outgoing multiplexer 715 to the L1-L2 bus.

5.3.2 L2 Address Repeater Arbiter

As shown in FIG. 6, the L2 address repeater also includes an arbiter 620. The arbiter 620 receives requests from the plurality of L1 ports 605, 610, and 615, and grants one L1 port the right to broadcast a transaction to the other L1 ports. In one embodiment, the arbitration algorithm is a round robin algorithm between the plurality of L1 ports 605, 610, and 615. However, other arbitration algorithms, such as priority-based algorithms, known by those skilled in the art may also be utilized.

As discussed in Section 5.3.1, in some embodiments of the invention, each of the L1 ports 605, 610, and 615 has an IRQ 705. In such embodiments, if an L1 port requests access to the L2-L2 bus and the request is not granted, the transaction is inserted in the L1 port's IRQ. If this occurs, the L1 port will continue to request access to the L2-L2 bus as long as its IRQ is not empty. In some embodiments of the invention, when an L1 port receives a new transaction and the IRQ is not empty, the new transaction is stored in the IRQ in a manner that will preserve the sequence of transactions originating from the L1's port.

5.4 Performance Optimizations 5.4.1 Predicting L2 Address Repeater to L1 Address Repeater Transfers Because each L1 address repeater is aware of the number of transactions in each of the IRQs in the L2 address repeater and each L1 address repeater implements the same arbitration scheme as the L2 address repeater, each L1 address repeater can predict all communications between the L1 address repeater and the L2 address repeater. Thus, an L1 address repeater can predict when it will receive a transaction from the L2 address repeater. When an L1 address repeater makes such a prediction, it enters a PREDICT-REQUEST state.

Upon entering the PREDICT-REQUEST state, the L1 address repeater can command its CPU arbiter to free the CPU buses for the transaction that will be received in the near future. In addition, the L1 address repeater can pre-configure the state of the combination ORQ modulator/Output demodulator 515 so that the received transaction will be passed to a portion of its CPU ports at the same time that the transaction is being sent to the L1 address repeater from the L2 address repeater. The result is that a transaction can traverse from the L2 address repeater port to a CPU port with minimum latency. In one embodiment, the transaction can traverse from the L2 address repeater port to a CPU port in a single cycle.

5.4.2 Predicting Transfers that Originated from a Particular L1 Address Repeater As discussed in Section 5.4.1, each L1 address repeater can predict all communications between the L1 address repeaters and the L2 address repeater. Thus, in some embodiments, an L1 address repeater can predict the L1 address repeater that originated a transaction that will next be broadcasted by the L2 address repeater.

If an L1 address repeater predicts that it originated the transaction that will be broadcast by the L2 address repeater, then the L1 address repeater will enter a state that will be referred to as a PREDICT-INCOMING state. Upon entering such a state, the L1 address repeater can retrieve the transaction from its ORQ instead of from the L2 address repeater. Thus, the L1 address repeater can retrieve the transaction from its ORQ, and broadcast the transaction to the non-originating CPU ports via the CPU-L1 buses.

As a result of the fact that the L1 address repeater is able to obtain the transaction from its ORQ, the L2 address repeater need not broadcast a transaction to an L1 address repeater that originated the transaction. The L2 address repeater need only broadcast the transaction to the L1 address repeaters that were not the originator of the transaction. Because the L2 address repeater does not need to utilize the L1 bus coupling the L2 address repeater to the L1 address repeater that originated a first transaction, the L1 address repeater may utilize the L1-L2 bus to send a second transaction up to the L2 address repeater at the same time that the L2 address repeater is sending the first transaction to the other L1 address repeaters.

In still another embodiment of the invention, the L1 address repeater will utilize information stored in the ORQ to identify the CPU that originated the transaction. In this embodiment, the L1 address repeater will only broadcast the transaction to the CPUs that did not originate the transaction. As the CPU-L1 bus that is coupled to the originating CPU is not being utilized during the bus cycle in which the other CPUs are receiving the transaction, the originating CPU port can send a second transaction to L1 address repeater's L2 port during this cycle.

5.5 Communications

Figure 8:
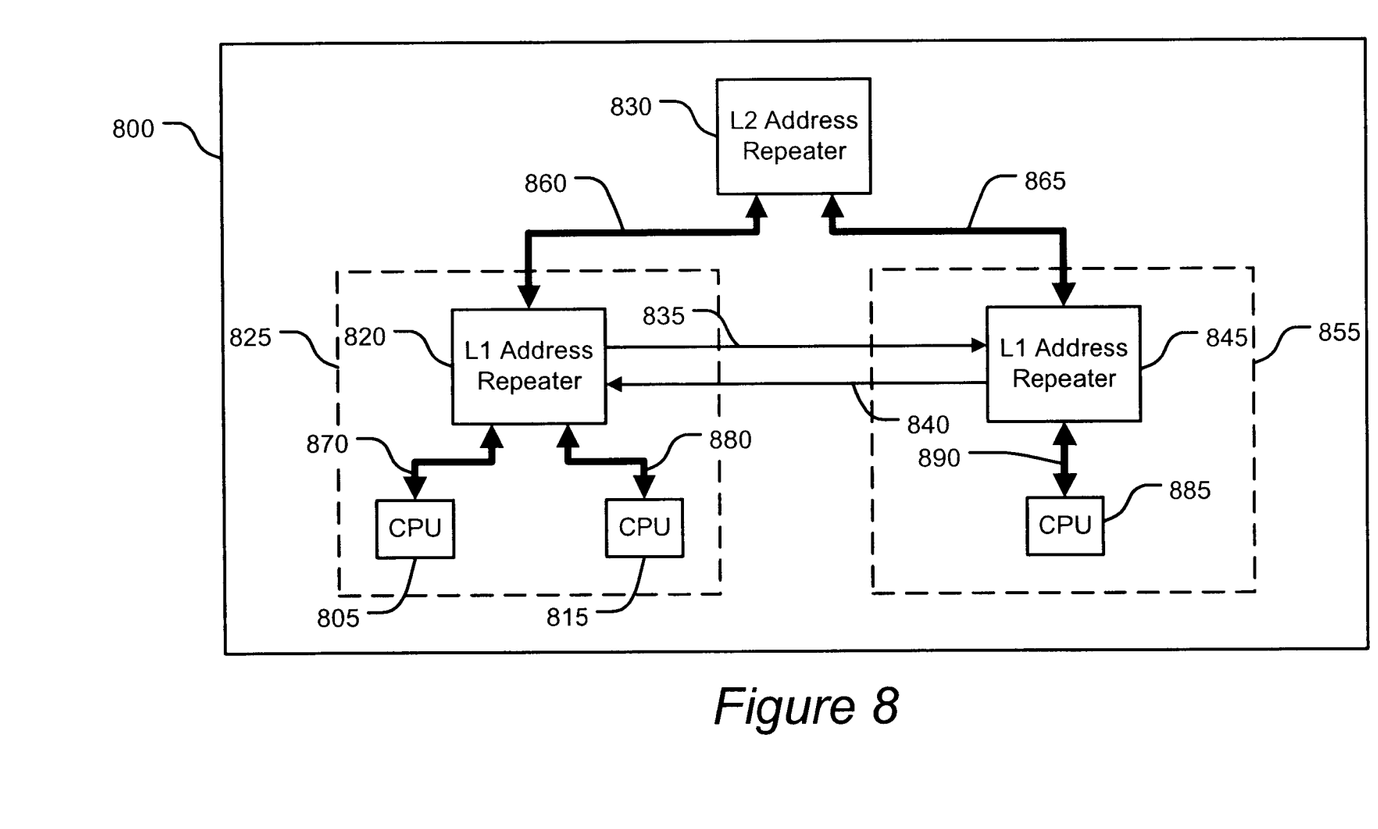
FIG. 8 presents a block diagram of a simplified multiprocessing computer system.
Figure 9:
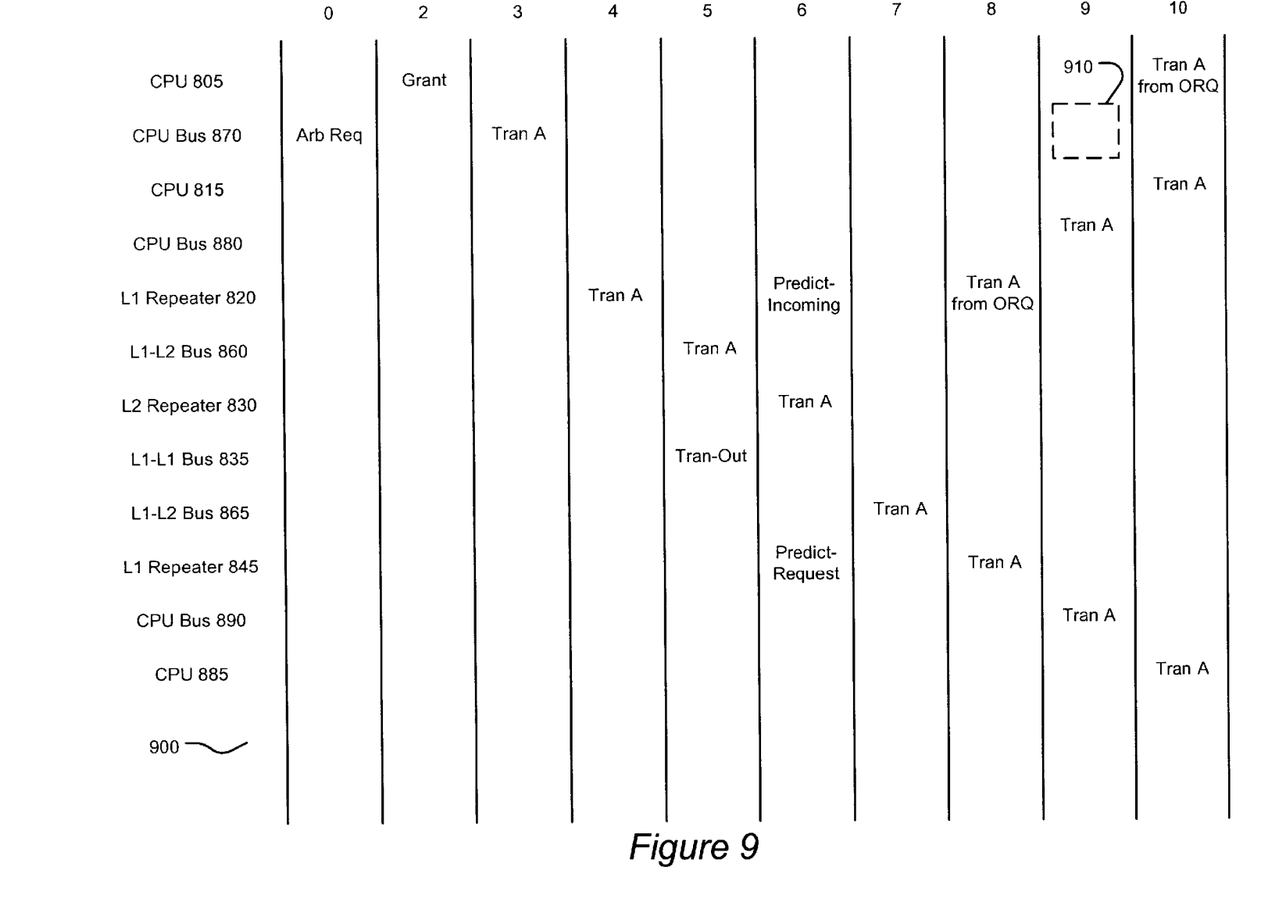
FIG. 9 presents a timing diagram of one method of operating the computer system of FIG. 8.

FIG. 8 presents a computer system 800, which is a simplified version of computer system 100. The timing diagram 900 shown in FIG. 9 illustrates one method of operating the computer system 800. Each column of timing diagram 900 corresponds to a particular bus cycle. In cycle 0, the CPU 805 requests access to the CPU bus 870. In cycle 2, the CPU 805 determines that it has been granted access to the CPU bus 870. Next, in cycle 3, the CPU 805 drives transaction A onto the CPU bus 870. In cycle 4, the L1 address repeater 820 receives the transaction and arbitrates for control of the L1-L2 bus 860. If the computer system 800 is idle, and no arbitration is needed, then transaction A will be driven to L2 address repeater 830 in cycle 5.

During cycle 5, L1 address repeater 820 also drives TRAN-OUT 835. L1 address repeater 845 receives this signal in cycle 6. Because the L1 address repeater 820, the L1 address repeater 845 and the L2 address repeater 830 all are aware that the L2 address repeater 830 will broadcast transaction A in the near future, the L1 address repeater 820 will enter the PREDICT-INCOMING state and the L1 address repeater 855 will enter the PREDICT-REQUEST state. In cycle 7, L2 address repeater 830 broadcasts transaction A to the L1-L2 bus 865. In cycle 8, transaction A traverses the L1 address repeater 845. Transaction A is also retrieved from the ORQ in the L1 address repeater 820.

In cycle 9, transaction A is broadcast on all the CPU buses 880 and 890 except the CPU bus 870. Transaction A is not broadcast on CPU bus 870 because the CPU coupled to the CPU bus 870, CPU 805, originated Transaction A. Instead, the CPU 805 retrieves Transaction A from its ORQ. Thus, in cycle 10, all the CPUs 805, 815 and 885 have received transaction A.

FIG. 9 indicates that the CPU-L1 bus 870 is not being utilized in cycle 9. Element 910 indicates the unutilized bus cycle. If the CPU 805 was prepared to send transaction B to the L1 address repeater 820 on the CPU bus 870 during cycle 9, then the CPU may do so. This performance optimization insures maximum utilization of bus bandwidth.

5.6 Conclusion

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art.

For example, it is contemplated to have additional L1 address repeater nodes, and more than one L2 address repeater. By increasing the number of such components, redundant components, such as a L2 address repeater, may be "swapped out" while allowing the computer system to continue to run.

In addition, while the above description and Figures discuss CPUs and CPU ports, the invention is not so limited. Any client device, such as but not limited to, memory controllers, I/O bridges, DSPs, graphics controllers, repeaters, such as address or data repeaters, and combinations and networks of the above client devices could replace the above described CPUs. Similarly, any port interfacing any of the above client devices could replace the described CPU ports and be within the scope of the present invention. Further, while the above description and Figures discuss address repeaters, the invention is not so limited. Any repeater, such as data repeaters could replace the described address repeaters and be within the scope of the present invention.

The above disclosure is not intended to limit the present invention. The scope of the present invention is defined by the appended claims.

It is claimed:

1. A computer system comprising:
   a) a first repeater;
   b) a second repeater coupled to the first repeater;
   c) a third repeater coupled to the first repeater;
   d) a first client coupled to the second repeater; and
   e) a second client coupled to the second repeater;
   wherein the second repeater contains a distributed arbiter that is aware of a plurality of transactions sent to the first repeater and that predicts whether the first repeater will send a transaction to the second repeater.

2. The computer system of claim 1, wherein the first repeater is an address repeater.

3. The computer system of claim 1, wherein the first client includes a central processing unit.

4. The computer system of claim 1, wherein the second repeater is operable to receive a signal from a third repeater that increments a counter in the second repeater.

5. The computer system of claim 4, wherein the distributed arbiter predicts whether the first repeater will send a transaction to the second repeater based at least in part upon the signal received from the third repeater.

6. The computer system of claim 4, wherein the signal indicates that the third repeater is sending a second transaction to the first repeater.

7. The computer system of claim 1, wherein the second repeater contains a switch module operable to send a signal to the third repeater that increments a counter in the third repeater.

8. The computer system of claim 7, wherein the counter is decremented upon receipt of a transaction that originated from the third repeater.

9. The computer system of claim 1, wherein the second repeater contains a second arbiter that arbitrates between the first client and the second client.

10. A computer system comprising:
    a) a first repeater;
    b) a second repeater coupled to the first repeater;
    c) a third repeater coupled to the first repeater;
    d) a first client coupled to the second repeater; and
    e) a second client coupled to the second repeater;
    wherein the second repeater contains a distributed arbiter that is aware of a plurality of transactions sent to the first repeater and that predicts whether the first repeater will send a transaction to the third repeater.

11. The computer system of claim 10, wherein the first repeater is an address repeater.

12. The computer system of claim 10, wherein the first client includes a central processing unit.

13. The computer system of claim 10, wherein the second repeater is operable to receive a signal from a third repeater that increments a counter in the second repeater.

14. The computer system of claim 13, wherein the distributed arbiter predicts whether the first repeater will send a transaction to the third repeater based at least in part upon the signal received from the third repeater.

15. The computer system of claim 13, wherein the signal indicates that the third repeater is sending a second transaction to the first repeater.

16. The computer system of claim 10, wherein the second repeater contains a switch module operable to send a signal to the third repeater that increments a counter in the third repeater.

17. The computer system of claim 16, wherein the counter is decremented upon receipt of a transaction that originated from the third repeater.

18. The computer system of claim 10, wherein the second repeater contains a second arbiter that arbitrates between the first client and the second client.

19. A computer system comprising:
    a) a first repeater;
    b) a second repeater coupled to the first repeater;
    c) a third repeater coupled to the first repeater;
    d) a first client coupled to the second repeater; and
    e) a second client coupled to the second repeater;
    wherein the second repeater contains a distributed arbiter that is aware of a plurality of transactions sent to the first repeater and that predicts whether the first repeater will send a transaction to the second repeater; and
    wherein the second repeater contains a distributed arbiter that is aware of a plurality of transactions sent to the first repeater and that predicts whether the first repeater will send a transaction to the third repeater.

20. The computer system of claim 19, wherein the first repeater is an address repeater.

* * * * *